United States Patent [19]

Watkins

[11] 3,860,740

[45] Jan. 14, 1975

[54] ENCAPSULATED COMPONENTS

[76] Inventor: David Vaughan Watkins, 66, Bedford Gardens, London, W. 8, England

[22] Filed: Mar. 9, 1973

[21] Appl. No.: 339,952

[30] Foreign Application Priority Data

Mar. 14, 1972 Great Britain .................... 11903/72

[52] U.S. Cl. ................. 174/52 PE, 29/588, 29/590, 29/627, 264/162, 264/272

[51] Int. Cl. ............................................ H05k 5/06

[58] Field of Search ........... 174/52 PE; 29/588, 590, 29/619, 624, 627, 630 G; 156/154; 264/39, 162, 232, 272, 340; 317/101 R, 234 E

[56] References Cited

UNITED STATES PATENTS

| | | | |
|---|---|---|---|
| 3,061,816 | 10/1962 | Reynolds | 174/52 PE UX |
| 3,264,248 | 8/1966 | Lee | 174/52 PE X |
| 3,322,992 | 5/1967 | Parker et al. | 174/52 PE UX |
| 3,564,352 | 2/1971 | Lehner | 174/52 PE X |

FOREIGN PATENTS OR APPLICATIONS

| | | | |
|---|---|---|---|
| 977,253 | 12/1964 | Great Britain | 174/52 PE |

*Primary Examiner*—Laramie E. Askin

*Attorney, Agent, or Firm*—Wenderoth, Lind & Ponack

[57] ABSTRACT

In the production of electronic or electrical components encapsulated in a clear plastic the ends of the conductor leads are connected to hollow ferrules or solid blocks of a relatively soft metal which can easily be cut by the tools employed for cutting the surfaces of the plastic. The blocks or ferrules may initially form part of a single die casting, the base of which is cut away in the course of cutting the plastic.

4 Claims, 6 Drawing Figures

ENCAPSULATED COMPONENTS

The present invention relates to the encapsulation of electrical and/or electronic components in a clear plastic. Solid items may be encapsulated in a clear plastic, such as an acrylic resin, by a relatively simple casting technique. However, because of the relatively long setting time of such castings, the moulds employed in the process must be very simple and economics thus preclude the use of elaborate moulds through which electrical connections can be carried.

Owing to the uneven shrinkage encountered during the curing of clear resin castings the visual appeal of the plastic casting, as removed from the mould, is poor until its surfaces have been subjected to machining or polishing. However any such operation must result in the severance of any conductor wires for embedded components and may also result in damage to the polishing or cutting tools. The diameter of the conductor wires employed for electronic components is far too small to permit a soldered joint to be formed with the severed end of such a wire, cut flush with the surface of, for example, an acrylic resin block, without risk of damage to the surface of the acrylic block.

In its widest aspects the present invention provides an electrical or electronic component encapsulated in a clear plastic in which the ends of the conductor leads are formed by ferrules or solid blocks of a metal sufficiently soft to permit it to be cut by conventional tools employed in cutting the plastic and of sufficient size to permit an external conductor to be connected to the exposed end of the ferrule or block without damage to the plastic. Whilst a soft zinc-based alloy is preferred for this purpose, copper or even soft grades of aluminium may be employed. The minimum size of the ferrule or block is about 1 mm, but it is preferred that it should be 2–4 mms in diameter, or even greater. The conductor leads of the encapsulated component are connected to the hollow ferrules or solid blocks in any convenient manner, such as soldering or welding, or (in the case of ferrules), crimping.

Where it is required that the ferrules or blocks should be accurately located in relation to each other in the face of, for example, an acrylic block, they may be formed as a portion of a zinc-based alloy die casting, which is used as a support onto which the electronic component is assembled. After casting the acrylic resin around the assembly in a mould, the acrylic block is machined to remove the base or connecting portion of the die casting, so as to leave separate hollow ferrules or solid blocks of die cast metal at defined positions in the surface of the block.

Referring now to the accompanying drawings

FIG. 1 illustrates a die cast support for use in the present invention;

FIG. 2 diagrammatically illustrates the incorporation of an electrical component, assembled on a support according to FIG. 1, into an acrylic casting;

Figure 1:
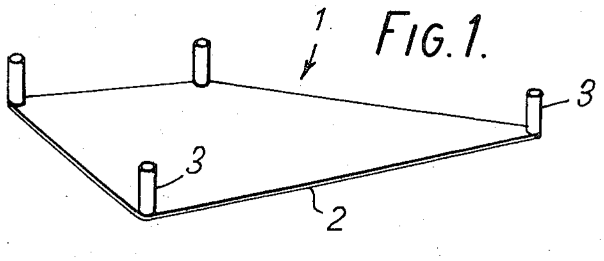
Figure 2:
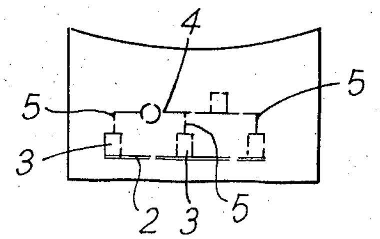
Figure 3:
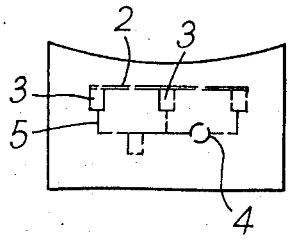
FIG. 3 illustrates an alternative procedure.
Figure 4:
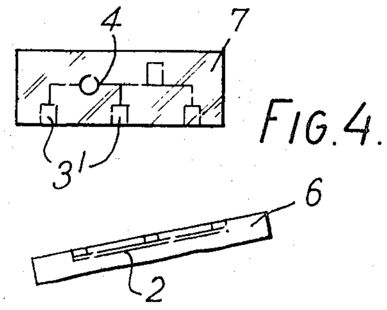
FIG. 4 illustrates the block formed by the procedure of FIG. 2 or FIG. 3 after final machining.

Referring to FIG. 1, the support 1 comprises a base 2 and a plurality of ferrule portions 3, which are preferably hollow. An electric component, indicated at 4 in FIGS. 2, 3 and 4 has conductor leads 5, which are soldered or otherwise connected to the ferrule portions 3 during the course of assembly. The assembly of support 1 and component 4 is then cast into a block of acrylic resin, using either of the alternative procedures indicated in FIGS. 2 and 3 (in which the casting mould has been omitted for convenience).

After removal from the mould, the cast block is machined to cut away a portion 6, in which is included the base 2 and the ends of the ferrule portions 3, leaving connecting ferrules 3′ exposed at defined positions at the surface of the block 7.

Figure 5:
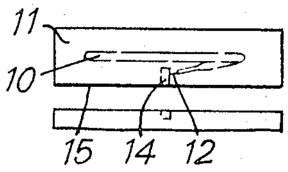
FIGS. 5 and 6 illustrate an alternative application of the procedure of the invention to the production of protected lighting components.
Figure 6:
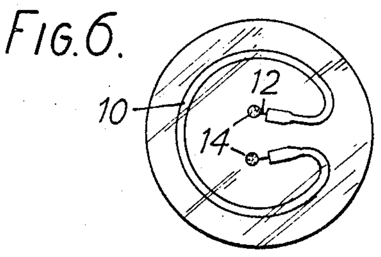

In an alternative application of the principles of the invention, a protected lighting unit is illustrated in FIGS. 5 and 6. A lighting element 10, such as a cold cathode neon, having a frangible envelope is cast into a block 11 of acrylic resin for protective purposes, so as to permit it to be used, for example, as an airfield landing light.

Before insertion in the casting mould the bare conductor wires 12, which are preferably tinned copper are soldered to substantial copper or zinc-based alloy terminal blocks 14, which are about ½ inch (1.25 cms) in diameter.

After the casting has been poured and cured, the acrylic block 11, containing the lighting element 10, is machined to leave a flat surface 15, as shown in FIG. 5.

The metal employed for the blocks or ferrules is preferably selected to have a softness as close to that of the clear plastic as possible and in most cases it is selected for ease of connection to tinned copper wire by soldering. The actual degree of softness required is in part dependent on the nature of the tools employed in cutting the clear plastic.

A typical electronic component to which the present invention might be applied is a radio receiver, in which all the circuitry may be encapsulated in an acrylic block. The system of the present invention would be employed for the provision of connections to essential external units, such as a loud speaker and the power source.

As will be apparent from the above description, the component may be encapsulated for purely decorative purposes or may be encapsulated for protective purposes or both.

In most instances the clear plastic will be an acrylic resin, but polyester resins and urea/formaldehyde resins may be employed.

I claim:

1. Electrical or electronic apparatus comprising a block of clear plastic material, said block having smooth machined surfaces, at least one electrical or electronic component encapsulated in said block, conductor leads connected to said at least one component, said leads being within said block, enlarged metal end portions of at least 2 mm. transverse breadth connected to said conductor leads, said end portions being located at a said block surface and being of soft metal machinable simultaneously and with the same tools as said plastic material, said block and said end portions having been machined such that said surfaces are smooth and said enlarged end portions have smooth faces in a said surface, whereby external electrical lead connections to said at least one component can be readily effected by connection to said enlarged end portions.

2. Electrical or electronic apparatus as claimed in claim 1 wherein said enlarged end portions are ferrules.

3. Electrical or electronic apparatus as claimed in claim 1 wherein said enlarged end portions are of a zinc based alloy.

4. Electrical or electronic apparatus as claimed in claim 1 wherein said component is a light-emitting unit having a frangible envelope.

* * * * *